United States Patent
Mukai

(10) Patent No.: US 6,570,680 B2
(45) Date of Patent: May 27, 2003

(54) FACSIMILE MACHINE AND FACSIMILE COMMUNICATION METHOD

(75) Inventor: Hirokazu Mukai, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/289,979

(22) Filed: Apr. 13, 1999

(65) Prior Publication Data

US 2002/0101624 A1 Aug. 1, 2002

(30) Foreign Application Priority Data

Apr. 13, 1998 (JP) .......................................... 10-101218

(51) Int. Cl.[7] .......................... H04N 1/32; G06F 13/00; H04B 1/38
(52) U.S. Cl. ...................... 358/468; 358/1.15; 375/222
(58) Field of Search ................................ 358/1.15, 405, 358/406, 468, 442, 434, 400, 412; 375/222

(56) References Cited

U.S. PATENT DOCUMENTS

| | | | |
|---|---|---|---|
| 5,721,731 A | | 2/1998 | Yoshida ....................... 370/296 |
| 5,812,281 A | * | 9/1998 | Mukai et al. ................ 358/435 |
| 5,943,364 A | * | 8/1999 | Yoshida ....................... 375/222 |
| 5,946,104 A | * | 8/1999 | Yodhida ....................... 358/412 |
| 6,141,403 A | * | 10/2000 | Dillon et al. ............. 379/93.31 |
| 2002/0057771 A1 | * | 5/2002 | Yoshida .................. 379/100.01 |

FOREIGN PATENT DOCUMENTS

| | | |
|---|---|---|
| JP | 8-149270 | 6/1996 |
| JP | 8-204684 | 8/1996 |
| JP | 9-116729 | 5/1997 |
| JP | 9-214716 | 8/1997 |
| JP | 410042117 A * | 2/1998 |

* cited by examiner

*Primary Examiner*—Madeleine Nguyen
(74) *Attorney, Agent, or Firm*—Foley & Lardner

(57) ABSTRACT

A facsimile machine which is provided with functions for executing communication of image data according to ITU-T V.34 mode comprises a communication section, a sequence timer and a control section. The communication section executes a communication sequence for transmitting the image data or receiving the image data. The sequence timer counts a time concerning suspension of the communication sequence according the V.34 mode. The control section changes the communication section into a state for executing communication of image data according to ITU-T V.17 mode, V.29 mode or V.27ter mode, in the case where the sequence timer counted to a predetermined period. Therefore, when the communication sequence according to the V.34 mode stopped for some reasons, the facsimile machine does not wait for recovery of the communication sequence keeping its status until a timeout-period elapses, but monitors the communication sequence until the sequence timer counts to the predetermined period and thereafter changes into the communication sequence according to the V.17 mode, the V.29 mode or the V.27ter mode, thereby communication of fax data can be completed normally even when the sequence according to the V.34 mode stopped, and the sender does not have to be charged with connection charge twice.

11 Claims, 3 Drawing Sheets

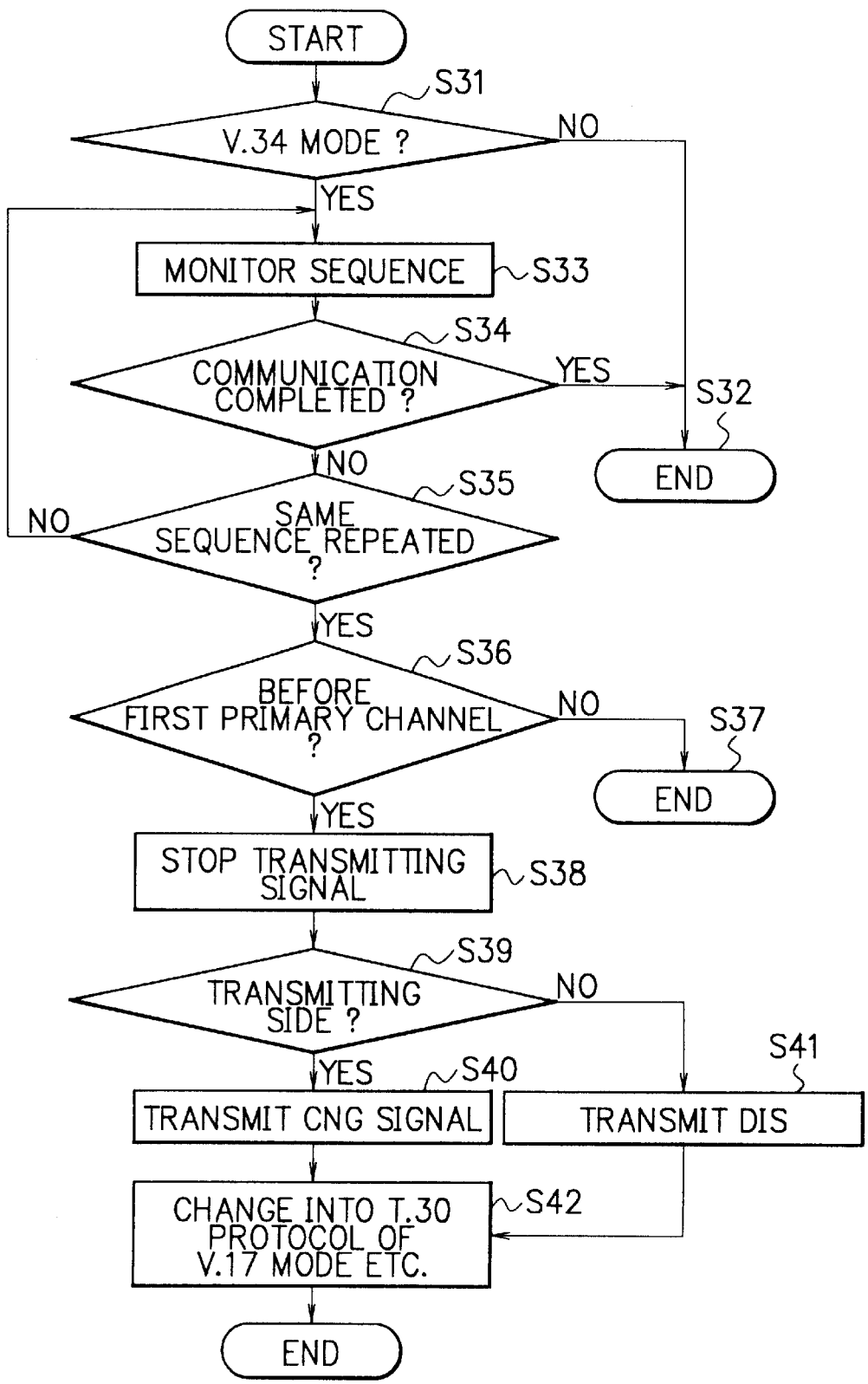

FACSIMILE MACHINE AND FACSIMILE COMMUNICATION METHOD

BACKGROUND OF THE INVENTION

The present invention relates to a facsimile machine and a facsimile communication method, and in particular, to a facsimile machine and a facsimile communication method by which communication of fax data can be completed even when a communication sequence according to the ITU-T V.34 mode stopped.

DESCRIPTION OF THE PRIOR ART

Among various types of information communication means provided today, information communication by facsimile has a strong point in that text, characters, images or whatever on a sheet can be sent easily and directly, and fax machines have come into wide use in many countries. Generally, fax machines are designed to execute communication (transmission and reception) of image data according to ITU-T recommendation. These days, some facsimile machines on the market are provided with modems according to ITU-T V.34.

However, in the case where a communication sequence according to ITU-T V.34 is stopped for some reasons, a typical conventional fax machine provided with the ITU-T V.34 modem waits for he next signal until a predetermined time-out period passes. When the time-out period has elapsed, the conventional fax machine judges that some communication error has occurred and thereby disconnects the connection (communication with another facsimile machine). Therefore, communication of fax data can not be completed, and what is worse, the sender has to be charged with connection charge (communication charge) in vain.

In communication in the ITU-T V.34 mode, communication bit rate is determined based on judgment on the condition of the communication line. The sequence for determining the communication bit rate is executed before the first primary channel (i.e. before the first image data communication phase). However, under impaired line conditions, the sequence for determining the communication bit rate can not be completed, and sometimes the sequence have to be stopped even before completing the judgment of the condition of the communication line. In such cases, the modem maintains its status and waits for the next signal until a predetermined time-out period passes. When the time-out period has elapsed, it is judged that a communication error occurred and the communication is disconnected. After the disconnection, another call is executed by the sender (or a transmitter facsimile machine) and the communication of fax data is completed, however, the sender has to be charged with connection charge twice.

SUMMARY OF THE INVENTION

It is therefore the primary object of the present invention to provide a facsimile machine, by which communication of fax data can normally be completed with reliability even in the case where the communication sequence according to the ITU-T V.34 stopped, and thereby waste of communication charge can be prevented.

Another object of the present invention is to provide a facsimile communication method, by which communication of fax data can normally be completed with reliability even in the case where the communication sequence according to the ITU-T V.34 stopped, and thereby waste of communication charge can be prevented.

In accordance with a first aspect of the present invention, there is provided a facsimile machine which is provided with functions for executing communication of image data according to ITU-T V.34 mode, comprising a communication means, a timer means and a control means. The communication means executes a communication sequence for transmitting the image data to a communication line of a telephone network or receiving the image data from the communication line. The timer means counts a time concerning suspension of the communication sequence according the V.34 mode which is executed by the communication means. The control means changes the communication means into a state for executing communication of image data according to ITU-T V.17 mode, V.29 mode or V.27ter mode, in the case where the timer means counted to a predetermined period.

In accordance with a second aspect of the present invention, in the first aspect, the timer means counts a time during which the communication sequence according to the V.34 mode keeps stopping in a stage before the communication means executes communication of image data using the first primary channel, as the time concerning suspension of a communication sequence. The control means changes the communication means into the state for executing communication of image data according to the V.17 mode, the V.29 mode or the V.27ter mode, in the stage before the first primary channel.

In accordance with a third aspect of the present invention, in the first aspect, the timer means counts a time during which the same communication sequence according to the V.34 mode is repeated in a stage before the communication means executes communication of image data using the first primary channel, as the time concerning suspension of a communication sequence. The control means changes the communication means into the state for executing communication of image data according to the V.17 mode, the V.29 mode or the V.27ter mode, in the stage before the first primary channel.

In accordance with a fourth aspect of the present invention, in the first aspect, the control means selects the communication mode (to which the communication means should be changed) out of the V.17 mode, the V.29 mode and the V.27ter mode, based on communication of a DIS (digital identification signal) and a DCS (digital command signal) with a facsimile machine on the other side.

In accordance with a fifth aspect of the present invention, there is provided a facsimile communication method for a facsimile machine that is provided with functions for executing communication of image data according to ITU-T V.34 mode. The facsimile communication method comprises a communication step, a timer step and a communication mode change step. In the communication step, a communication sequence according to the V.34 mode is executed by a communication means for transmitting the image data or receiving the image data. In the timer step, a time concerning suspension of the communication sequence according the V.34 mode is counted by a timer means. And in the communication mode change step, the communication means is changed into a state for executing communication of image data according to ITU-T V.17 mode, V.29 mode or V.27ter mode, in the case where the timer means counted to a predetermined period.

In accordance with a sixth aspect of the present invention, in the fifth aspect, the timer means in the timer step counts a time during which the communication sequence according to the V.34 mode keeps stopping in a stage before the communication means executes communication of image data using the first primary channel, as the time concerning suspension of a communication sequence. The communication mode change step is started in the stage before the first primary channel.

In accordance with a seventh aspect of the present invention, in the fifth aspect, the timer means in the timer step counts a time during which the same communication sequence according to the V.34 mode is repeated in a stage before the communication means executes communication of image data using the first primary channel, as the time concerning suspension of a communication sequence. The communication mode change step is started in the stage before the first primary channel.

In accordance with an eighth aspect of the present invention, in the communication mode change step in the fifth aspect, the communication mode to which the communication means should be changed is selected out of the V.17 mode, the V.29 mode and the V.27ter mode, based on communication of a DIS (digital identification signal) and a DCS (digital command signal) with a facsimile machine on the other side.

BRIEF DESCRIPTION OF THE DRAWINGS

The objects and features of the present invention will become more apparent from the consideration of the following detailed description taken in conjunction with the accompanying drawings, in which:

FIG. 3 is a flow chart showing an abstract of the operation of a communication control section of a facsimile machine according to a second embodiment of the present invention.

DESCRIPTION OF THE PREFERRED EMBODIMENTS

Figure 1:
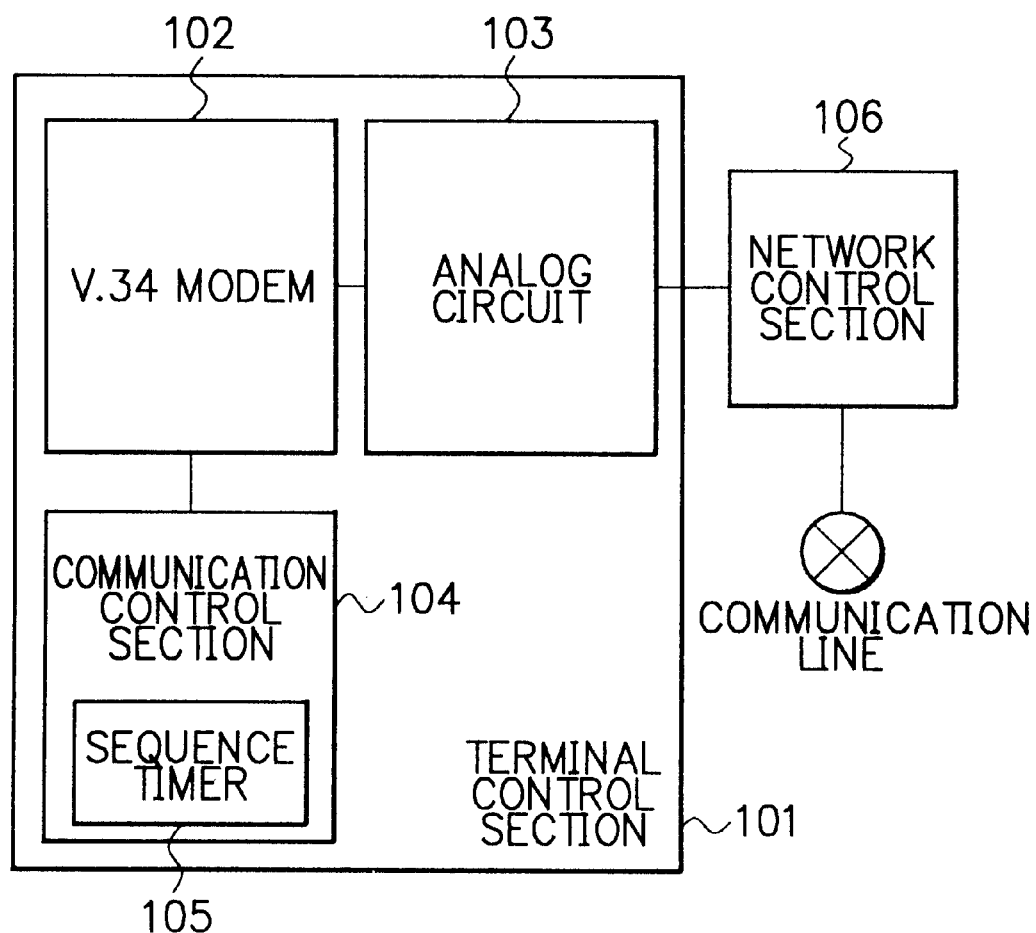
FIG. 1 is a schematic block diagram showing a facsimile machine according to the present invention.

Referring now to the drawings, a description will be given in detail of preferred embodiments in accordance with the present invention.

FIG. 1 is a schematic block diagram showing a facsimile machine according to a first embodiment of the present invention. The facsimile machine comprises a terminal control section 101 for controlling components of the facsimile machine and a network control section 106 as the interface of the facsimile machine to a communication line of a telephone network such as a PSTN (public switched telephone network), an ISDN (integrated services digital network), etc.

The terminal control section 101 includes a V.34 modem 102, an analog circuit 103 and a communication control section 104. The V.34 modem 102 executes modulation/demodulation according to V.34 mode, V.17 mode, V.29 mode, V.27ter mode and V.21ch2 mode. The analog circuit 103 executes signal level control so that analog signals which have been modulated by the V.34 modem 102 will be transmitted to the communication line of the telephone network at a predetermined signal level and signals supplied from the communication line will be inputted to the V.34 modem 102 at a stable level. The communication control section 104 controls the V.34 modem 102. The communication control section 104 includes a sequence timer 105 which is used in the case where the V.34 sequence stopped.

The components of the facsimile machine of FIG. 1 is realized by, for example, one or more microprocessor unit which are composed of one or more CPUs (Central Processing Units), ROM (Read Only Memory), RAM (Random Access Memory), etc. It is also possible to realize the components of the facsimile machine by software and a microprocessor unit for executing instructions of the software.

Figure 2:
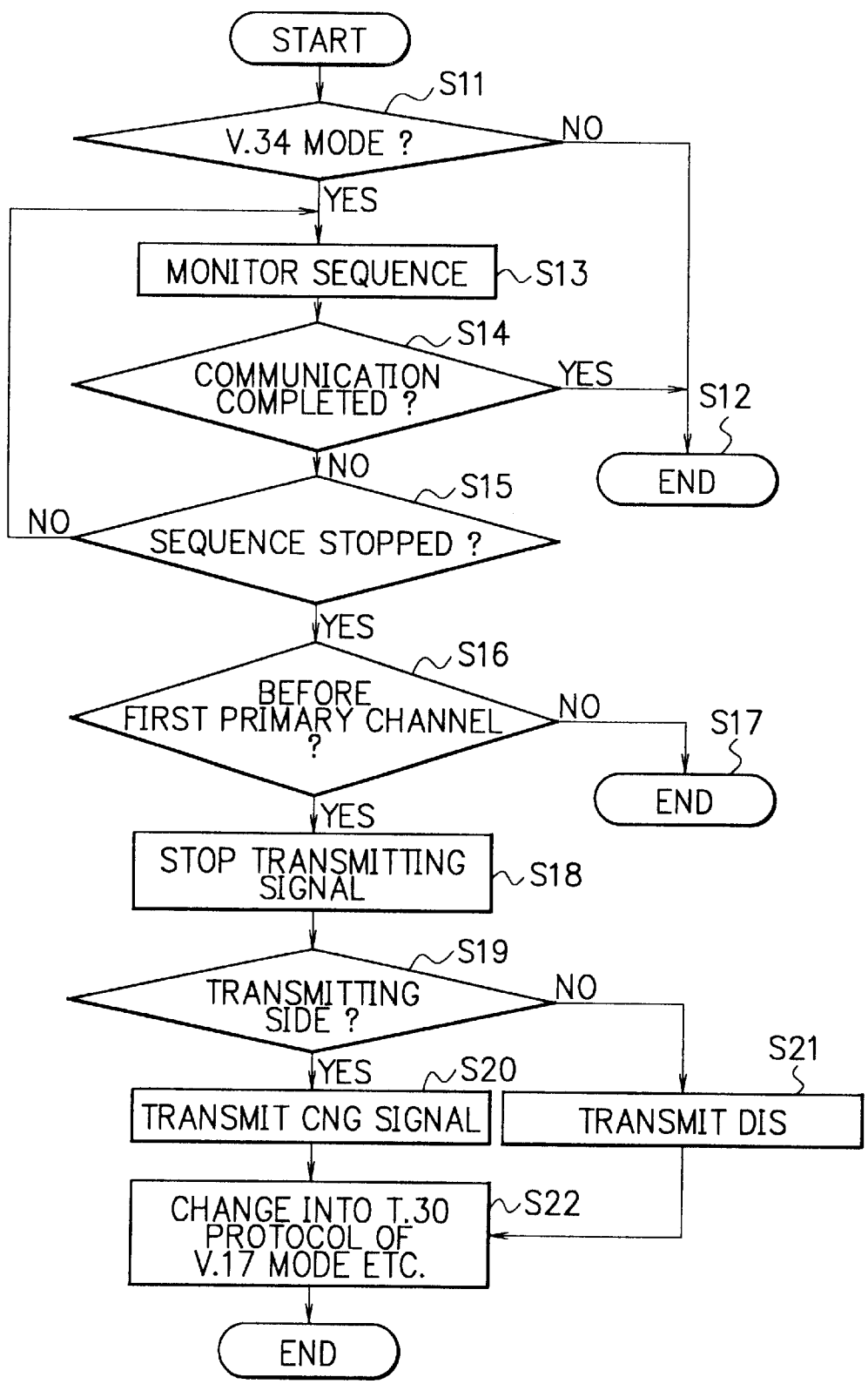
FIG. 2 is a flow chart showing an abstract of the operation of a communication control section of a facsimile machine according to a first embodiment of the present invention.

In the following, the operation of the communication control section 104 will be described referring to FIG. 2. FIG. 2 is a flow chart showing an abstract of the operation of the communication control section 104 of the facsimile machine according to the first embodiment of the present invention when the facsimile machine communicates image data.

When a call from the facsimile machine of FIG. 1 or a call from another facsimile machine to the facsimile machine of FIG. 1 occurred, capability information is exchanged in the V.21ch2 mode and thereby communication mode between the facsimile machines are determined to V.34 mode, the V.17 mode, the V.29 mode or the V.27ter mode (the phase 1). In step S11, if the communication between the facsimile machines is being executed in a mode other than the V.34 mode (i.e. in the V.17 mode, the V.29 mode or the V.27ter mode) ("NO" in the step S11), the process of FIG. 2 is ended (step S12). If the communication is being executed in the V.34 mode ("YES" in the step S11), the communication control section 104 monitors the communication sequence (step S13). In step S14, the communication control section 104 judges whether or not the communication between the facsimile machines has been completed. If the communication has been completed ("YES" in the step S14), the process of FIG. 2 is ended (step S12). If the communication has not been completed ("NO" in the step S14), the communication control section 104 judges whether or not the communication sequence has stopped (step S15). If the communication sequence has not stopped, that is, if the communication sequence is proceeding normally ("NO" in the step S15), the process is returned to the step S13. Therefore, the process from the step S13 to the step S15 is repeated as long as the communication sequence proceeds normally.

On the other hand, if the communication sequence has stopped, the communication control section 104 activates the sequence timer 105, and thereafter monitors the communication sequence until the sequence timer 105 counts to a predetermined period (N sec). When the sequence timer 105 counted to the predetermined period, the communication control section 104 judges that the communication sequence has stopped completely ("YES" in the step S15), and the process proceeds to the next step S16. In the step S16, the communication control section 104 judges whether or not the communication sequence stopped before the first primary channel. If the sequence stop occurred during the first primary channel or after the first primary channel ("NO" in the step S16), the process of FIG. 2 is ended (step S17). If the sequence stop occurred before the first primary channel ("YES" in the step S16), the communication control section 104 stops a signal which the facsimile machine of FIG. 1 is transmitting, in order to change into communication according to T.30 protocol of the V.17 mode, the V.29 mode or the V.27ter mode (step S18).

Subsequently, the communication control section 104 checks whether or not the facsimile machine of FIG. 1 is on the transmitting side (i.e. whether or not the facsimile machine of FIG. 1 is a transmitter facsimile machine) (step S19). If the facsimile machine is a transmitter facsimile machine ("YES" in the step S19), the communication control section 104 transmits a CNG (calling tone) signal, and thereafter monitors a DIS (digital identification signal) which will be sent from the receiving side (step S20). When the DIS from the receiving side reached, the communication control section 104 determines communication mode between the facsimile machines to the V.17 mode, the V.29 mode or the V.27ter mode based on the DIS, transmits a DCS (digital command signal) to the receiving side in order to inform the receiving side of the communication mode, and changes into execution of a communication sequence according to T.30 protocol of the communication mode (step S22).

On the other hand, if the facsimile machine of FIG. 1 is on the receiving side (i.e. if the facsimile machine is a receiver facsimile machine) ("NO" in the step S19), the communication control section 104 transmits a DIS, and thereafter monitors a DCS which will be sent from the transmitting side (step S21). When the DCS from the transmitting side reached, the communication control section 104 changes into execution of a communication sequence according to T.30 protocol of the V.17 mode, the V.29 mode or the V.27ter mode, based on the DCS (step S22).

As described above, in the facsimile machine and the facsimile communication method according to the first embodiment of the present invention, in the case where the communication sequence according to ITU-T V.34 stopped for some reasons before the first primary channel, the communication control section 104 does not wait for recovery of the communication sequence keeping its status until the timeout-period elapses, but monitors the communication sequence until the predetermined period of the sequence timer 105 elapses and thereafter changes into the communication sequence of the V.17 mode, the V.29 mode or the V.27ter mode. By the operation, communication of fax data can be executed and completed normally even when the sequence according to the ITU-T V.34 mode stopped, without ending the communication due to the communication error. Consequently, the sender does not have to be charged with connection charge twice and thereby communication cost can be reduced. Further, total communication time for sending the fax is shortened and the operator of the transmitter facsimile machine is not burdened with the task of sending the fax again, thereby the convenience of the users of facsimile machines can be improved.

In the following, a facsimile machine and a facsimile communication method according to a second embodiment of the present invention will be described referring to FIG. 1 and FIG. 3. The facsimile machine of the second embodiment has the same composition as that of the facsimile machine of the first embodiment as shown in FIG. 1, however, the operation of the communication control section 104 is a little different.

In the following, the operation of the communication control section 104 of the second embodiment will be described referring to FIG. 3. FIG. 3 is a flow chart showing an abstract of the operation of the communication control section 104 of the second embodiment when the facsimile machine communicates image data.

When a call from the facsimile machine of FIG. 1 or a call from another facsimile machine to the facsimile machine of FIG. 1 occurred, capability information is exchanged in the V.21ch2 mode and thereby communication mode between the facsimile machines are determined to the V.34 mode, the V.17 mode, the V.29 mode or the V.27ter mode. In step S31, if the communication between the facsimile machines is being executed in a mode other than the V.34 mode (i.e. in the V.17 mode, the V.29 mode or the V.27ter mode) ("NO" in the step S31), the process of FIG. 3 is ended (step S32). If the communication is being executed in the V.34 mode ("YES" in the step S31), the communication control section 104 monitors the communication sequence (step S33). In step S34, the communication control section 104 judges whether or not the communication between the facsimile machines has been completed. If the communication has been completed ("YES" in the step S34), the process of FIG. 3 is ended (step S32). If the communication has not been completed ("NO" in the step S34), the communication control section 104 judges whether or not the same sequence is being repeated (i.e. whether or not retry is repeated in the communication sequence) (step S35). If the same sequence is not being repeated, that is, if the communication sequence is proceeding normally ("NO" in the step S35), the process is returned to the step S33. Therefore, the process from the step S33 to the step S35 is repeated as long as the communication sequence proceeds normally.

On the other hand, if the same sequence is being repeated ("YES" in the step S35), the communication control section 104 activates the sequence timer 105, and thereafter monitors the communication sequence until the sequence timer 105 counts to a predetermined period (N sec). When the sequence timer 105 counted to the predetermined period, the communication control section 104 judges that the communication sequence has stopped completely ("YES" in the step S35), and the process proceeds to the next step S36. In the step S36, the communication control section 104 judges whether or not the communication sequence stopped before the first primary channel. If the sequence stop occurred during the first primary channel or after the first primary channel ("NO" in the step S36), the process of FIG. 3 is ended (step S37). If the sequence stop occurred before the first primary channel ("YES" in the step S36), the communication control section 104 stops a signal which the facsimile machine of FIG. 1 is transmitting, in order to change into communication according to T.30 protocol of the V.17 mode, the V.29 mode or the V.27ter mode (step S38).

Subsequently, the communication control section 104 checks whether or not the facsimile machine of FIG. 1 is on the transmitting side (i.e. whether or not the facsimile machine of FIG. 1 is a transmitter facsimile machine) (step S39). If the facsimile machine is a transmitter facsimile machine ("YES" in the step S39), the communication control section 104 transmits a CNG signal and thereafter monitors a DIS which will be sent from the receiving side (step S40). When the DIS from the receiving side reached, the communication control section 104 determines communication mode between the facsimile machines to the V.17 mode, the V.29 mode or the V.27ter mode based on the DIS, transmits a DCS to the receiving side in order to inform the receiving side of the communication mode, and changes into execution of a communication sequence according to T.30 protocol of the communication mode (step S42).

On the other hand, if the facsimile machine of FIG. 1 is on the receiving side (i.e. if the facsimile machine is a receiver facsimile machine) ("NO" in the step S39), the communication control section 104 transmits a DIS, and thereafter monitors a DCS which will be sent from the transmitting side (step S41). When the DCS from the transmitting side reached, the communication control section 104 changes into execution of a communication sequence according to T.30 protocol of the V.17 mode, the V.29 mode or the V.27ter mode, based on the DCS (step S42).

As described above, in the facsimile machine and the facsimile communication method according to the second embodiment of the present invention, in the case where the same communication sequence according to the ITU-T V.34 mode is repeated (i.e. in the case where retry is repeated in the communication sequence according to the V.34 mode) before the first primary channel, the communication control section 104 does not wait for recovery of the communication sequence keeping its status until the timeout-period elapses, but monitors the communication sequence until the predetermined period of the sequence timer 105 elapses and thereafter changes into the communication sequence of the V.17 mode, the V.29 mode or the V.27ter mode. By the operation, communication of fax data can be executed and completed normally even when the communication sequence according to the ITU-T V.34 mode stopped (i.e. even when the same sequence according to the ITU-T V.34 mode keeps repeating), without ending the communication due to the communication error. Consequently, the same effects as those of the first embodiment can be obtained. Incidentally, it is also possible to combine the first embodiment and the second embodiment and thereby increase the possibility of completion of communication.

As set forth hereinabove, in the facsimile machine and the facsimile communication method according to the present invention, a time concerning suspension of a communication sequence according the ITU-T V.34 mode is clocked by the sequence timer 105, and when the sequence timer 105 counted to a predetermined period, the communication sequence according the V.34 mode is ended and another communication sequence according to the V.17 mode, the V.29 mode or the V.27ter mode is started. Therefore communication of fax data can be executed and completed even in the case where the communication sequence according the V.34 mode stopped for some reasons, and thereby waste of communication charge can be prevented and the convenience of the user of the facsimile machine can be improved.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A facsimile machine having an ITU-T V.34 mode, comprising:
   a communication means adapted to execute a communication sequence, according to said V.34 mode, according to which image data will be transmitted to a communication line of a telephone network;
   a timer means for counting a suspension time of the communication sequence according to the V.34 mode executed by the communication means; and
   a control means adapted to change the communication means into a state for executing communication of image data according to ITU-T V.17 mode, V.29 mode, or V.27ter mode, when the suspension time reaches a predetermined period,
   wherein the predetermined suspension time indicates a failure in executing the communication sequence in the V.34 mode, and wherein the control means is adapted to change the communication means into a state for executing communication of image data according to the V.17 mode, the V.29 mode, or the V.27ter mode before image data is transmitted.

2. A facsimile machine as claimed in claim 1, wherein:
   the timer means counts the suspension time when the communication sequence according to the V.34 mode stops before the communication means executes communication of image data via a primary channel.

3. A facsimile machine as claimed in claim 1, wherein:
   the timer means counts the suspension time when the same communication sequence according to the V.34 mode repeats before the communication means executes communication of image data via a primary channel.

4. A facsimile machine as claimed in claim 1, wherein the control means selects the communication mode among the V.17 mode, the V.29 mode, and the V.27ter mode, based on communication of a DIS (digital identification signal) and a DCS (digital command signal) with a communicating facsimile machine.

5. A facsimile communication method having an ITU-T V.34 mode, comprising the steps of:
   executing a communication sequence according to the V.34 mode with a communication means for transmitting the image data;
   counting a suspension time of the communication sequence according the V.34 mode with a timer means; and
   changing the communication means into a state for executing communication of image data according to a second mode, when the suspension time reaches a predetermined period,
   wherein the predetermined suspension time indicates a failure in executing the communication sequence in the ITU-T V.34 mode, wherein said second mode is selected from the group consisting of ITU-T V.17 mode, V.29 mode, and V.27ter mode, and wherein the communication means is changed into a state for executing communication of image data according to the second mode before image data is transmitted.

6. A facsimile communication method as claimed in claim 5, wherein:
   the timer means in the counting step counts the suspension time when the communication sequence according to the V.34 mode stops.

7. A facsimile communication method as claimed in claim 5, wherein:
   the timer means in the counting step counts the suspension time when the same communication sequence according to the V.34 mode repeats.

8. A facsimile communication method as claimed in claim 5, wherein in the communication mode change step, the control means selects the communication mode among the V.17 mode, the V.29 mode, and the V.27ter mode, based on communication of a DIS (digital identification signal) and a DCS (digital command signal) with a communicating facsimile machine.

9. A facsimile machine comprising:
   a V.34 modem for transmitting image data to a communication line of a telephone network according to a communication sequence executed in a V.34 mode;
   a timer for counting a suspension time of the communication sequence according the V.34 mode; and
   a communication controller adapted to change the V.34 mode to ITU-T V.17 mode, V.29 mode, or V.27ter mode, when the suspension time reaches a predetermined period,
   wherein the predetermined suspension time indicates a failure in executing the communication sequence in the V.34 mode, and wherein the control controller is adapted to change the V.34 mode to the ITU-T V.17 mode, V.29 mode, or the V.27ter mode before image data is transmitted.

10. A facsimile machine according to claim 9, wherein:
the timer counts the suspension time when the communication sequence according to the V.34 mode stops before the V.34 modem communicates image data via a primary channel, and
the communication controller changes the V.34 modem from the V.34 mode into one of the V.17 mode, the V.29 mode, or the V.27ter mode, before communicating via the primary channel.

11. A facsimile machine according to claim 9, wherein:
the timer counts the suspension time when the same communication sequence according to the V.34 mode repeats before the V.34 modem communicates image data via a primary channel, and
the communication controller changes the V.34 modem from the V.34 mode to one of the V.17 mode, the V.29 mode, and the V.27ter mode, before communicating via the primary channel.

* * * * *